(12) United States Patent
Hosbettu et al.

(10) Patent No.: US 10,365,799 B2
(45) Date of Patent: Jul. 30, 2019

(54) SYSTEM AND METHODS FOR CREATING ON-DEMAND ROBOTIC PROCESS AUTOMATION

(71) Applicant: Wipro Limited, Bangalore (IN)

(72) Inventors: Raghavendra Hosbettu, Bangalore (IN); RamPrasad Kanakatte Ramanna, Bangalore (IN); Raghottam Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 454 days.

(21) Appl. No.: 15/078,634

(22) Filed: Mar. 23, 2016

(65) Prior Publication Data

US 2017/0228119 A1 Aug. 10, 2017

(30) Foreign Application Priority Data

Feb. 9, 2016 (IN) .............................. 201641004533

(51) Int. Cl.
*G06F 3/0484* (2013.01)
*G06T 7/00* (2017.01)
(Continued)

(52) U.S. Cl.
CPC .......... *G06F 3/0484* (2013.01); *G06F 3/0481* (2013.01); *G06N 7/005* (2013.01); *G06T 7/0085* (2013.01)

(58) Field of Classification Search
CPC ... G06Q 10/10; G06F 3/0481; G06F 11/3438; G06F 9/453; G06N 7/005
See application file for complete search history.

(56) References Cited

U.S. PATENT DOCUMENTS

| 5,701,139 A | | 12/1997 | Weinbaum et al. |
| 5,745,383 A | * | 4/1998 | Barber ................ G06Q 10/10 702/2 |

(Continued)

FOREIGN PATENT DOCUMENTS

CA 2506909 5/2004

*Primary Examiner* — Jennifer N To
*Assistant Examiner* — Eric J Yoon
(74) *Attorney, Agent, or Firm* — Finnegan, Henderson, Farabow, Garrett & Dunner, LLP (57) ABSTRACT

System and methods for creating on-demand robotic process automation are described. In one example hardware processor-implemented method embodiment, an application providing graphical user interfaces is executed, and a monitoring program executing independently of the application. Using the monitoring program, a screen capture image is obtained of the graphical user interfaces. Graphical user interface elements are identified using a computerized image processing technique. Metadata on presence of confirmatory predictors for the elements, and confirmatory predictor vectors for the interfaces, are generated. Confusion indices for the confirmatory predictors and the confirmatory predictor vectors are calculated, Threshold values are generated based on the calculated confusion indices. A decision table is generated storing sequences of user interactions with the graphical user interface elements. A subset of the stored sequences is identified as yielding a successful outcome. A process automation model is generated and validated based on the identified subset, using the threshold values.

20 Claims, 9 Drawing Sheets

(51) Int. Cl.
    *G06F 3/0481*     (2013.01)
    *G06N 7/00*     (2006.01)

(56) References Cited

U.S. PATENT DOCUMENTS

| | | | |
|---|---|---|---|
| 5,819,254 A * | 10/1998 | Kawai | G06F 17/30595 |
| 7,533,344 B1 * | 5/2009 | Motoyama | G06F 11/3414 |
| | | | 709/224 |
| 7,945,434 B2 | 5/2011 | Lovas et al. | |
| 8,112,369 B2 | 2/2012 | Abramson | |
| 8,468,110 B1 * | 6/2013 | Podgorny | G06F 11/3438 |
| | | | 706/45 |
| 8,832,765 B2 * | 9/2014 | Cohen | H04N 7/17309 |
| | | | 725/116 |
| 2005/0054381 A1 | 3/2005 | Lee et al. | |
| 2005/0143138 A1 | 6/2005 | Lee et al. | |
| 2013/0179365 A1 | 7/2013 | Passova et al. | |
| 2016/0203003 A1 * | 7/2016 | Balasubramanian | G06F 16/248 |
| | | | 715/707 |

* cited by examiner

| 402 | Leave Approval Form |
|---|---|

404 — Employee Name
406 —

408 — Employee ID
410 —

412 — LEAVE TYPE
414 — Select Leave Type ⌄

416 — FROM DATE
418 — Select Date 🗓

420 — TO DATE
422 — Select Date 🗓

424 — Comments for Rejection
426 —

428 — ✓ APPROVE   ✗ REJECT — 430

FIG. 4

| Screen ID 510 | Control Type 520 | Control Name 530 | Activity 540 | Confirmatory Predictor 550 | Order of Activity 560 | Next Activity 570 | Image 580 |
|---|---|---|---|---|---|---|---|
| LEAV-APR | Label | Employee Name | NA | Yes | NA | NA | <filename> |
| LEAV-APR | Text | Employee Name | NA | Yes | NA | NA | <filename> |
| LEAV-APR | Label | Employee ID | NA | Yes | NA | NA | <filename> |
| LEAV-APR | Text | Employee ID | NA | Yes | NA | NA | <filename> |
| LEAV-APR | Dropdown | Leave Type | NA | Yes | NA | NA | <filename> |
| LEAV-APR | Label | Leave From | NA | Yes | NA | NA | <filename> |
| LEAV-APR | Date Picker | Leave From | NA | Yes | NA | NA | <filename> |
| LEAV-APR | Label | Leave To | NA | Yes | NA | NA | <filename> |
| LEAV-APR | Date Picker | Leave To | NA | Yes | NA | NA | <filename> |
| LEAV-APR | Text | Comments (Conditional) | Input | Yes | 1 | Reject | <filename> |
| LEAV-APR | Button | Approve | Click | Yes | 1 | 1 | <filename> |
| LEAV-APR | Button | Reject | Click | Yes | 2 | 1 | <filename> |

SYSTEM AND METHODS FOR CREATING ON-DEMAND ROBOTIC PROCESS AUTOMATION

PRIORITY CLAIM

This U.S. patent application claims priority under 35 U.S.C. § 119 to: India Application No. 201641004533, filed Feb. 9, 2016. The entire contents of the aforementioned application are incorporated herein by reference.

TECHNICAL FIELD

This disclosure relates generally to process automation, and more particularly to system and methods for creating on-demand robotic process automation.

BACKGROUND

The inventors here have recognized several technical problems with conventional process automation systems, as explained below. There are many applications which have user interfaces designed to use specific functions and accomplish certain goals through a sequence of operations. Some of these processes/activities are repetitive in nature. Most of these have associated rules and specific sequence of actions to be followed to complete the task, for example, use of a web application to book a travel ticket, using an SAP application to allocate resources, etc. Current systems do not provide a cognitive solution that learns and adapts on its own continuously. Current systems also are incapable of following a user's actions, system behavior, system response, error conditions, key board shortcuts, and extracting of the goal of the task therefrom. Nor can current systems discover the sequence of steps to the goal by following the various paths and the optimal path to the goal for the user.

Thus, current systems are technologically incapable of providing a goal oriented self-learning agent, or of methods for sharing such an agent once it has matured enough. Current system also are incapable of determining user intent and predicting possible user goals, and suggesting optimal ways of achieving those goals.

SUMMARY

Embodiments of the present disclosure present technological improvements as solutions to one or more of the above-mentioned technical problems recognized by the inventors in conventional systems. For example, in one embodiment, a system is disclosed for adaptive process automation. The system may comprise a hardware processor; and a memory storing instructions executable by the hardware processor to perform a method. The method may include executing, via a hardware processor, one or more applications providing one or more graphical user interfaces, and a monitoring program executing independently of the one or more applications. The method may further include obtaining, via the hardware processor using the monitoring program, a screen capture image of the one or more graphical user interfaces. Further, the method may include identifying, via the hardware processor, one or more graphical user interface elements included in the one or more graphical user interfaces, using one or more computerized image processing techniques. Also, the method may include generating, via the hardware processor: metadata on presence of one or more confirmatory predictors for the one or more graphical user interface elements, and one or more confirmatory predictor vectors for the one or more graphical user interfaces based on the one or more confirmatory predictors. The method may include calculating, via the hardware processor one or more confusion indices for the one or more confirmatory predictors, one or more confusion indices for the one or more confirmatory predictor vectors, and one or more threshold values based on the calculated confusion indices. The method may further include generating, via the hardware processor, a decision table storing one or more sequences of user interactions with the one or more graphical user interface elements. The method may also include identifying, via the hardware processor, a subset of the stored one or more sequences of user interactions as yielding a successful outcome. Also, the method may include generating and validating, via the hardware processor, a process automation model based on the identified subset of the stored one or more sequences of user interactions, using the generated one or more threshold values.

In another embodiment, a hardware processor-implemented method for adaptive process automation is disclosed. The method may include executing, via a hardware processor, one or more applications providing one or more graphical user interfaces, and a monitoring program executing independently of the one or more applications. The method may further include obtaining, via the hardware processor using the monitoring program, a screen capture image of the one or more graphical user interfaces. Further, the method may include identifying, via the hardware processor, one or more graphical user interface elements included in the one or more graphical user interfaces, using one or more computerized image processing techniques. Also, the method may include generating, via the hardware processor: metadata on presence of one or more confirmatory predictors for the one or more graphical user interface elements, and one or more confirmatory predictor vectors for the one or more graphical user interfaces based on the one or more confirmatory predictors. The method may include calculating, via the hardware processor: one or more confusion indices for the one or more confirmatory predictors, one or more confusion indices for the one or more confirmatory predictor vectors, and one or more threshold values based on the calculated confusion indices. The method may further include generating, via the hardware processor, a decision table storing one or more sequences of user interactions with the one or more graphical user interface elements. The method may also include identifying, via the hardware processor, a subset of the stored one or more sequences of user interactions as yielding a successful outcome. Also, the method may include generating and validating, via the hardware processor, a process automation model based on the identified subset of the stored one or more sequences of user interactions, using the generated one or more threshold values.

In yet another embodiment, a non-transitory computer-readable medium is disclosed storing computer-executable instructions for performing an adaptive process automation method. The method may include executing, via a hardware processor, one or more applications providing one or more graphical user interfaces, and a monitoring program executing independently of the one or more applications. The method may further include obtaining, via the hardware processor using the monitoring program, a screen capture image of the one or more graphical user interfaces. Further, the method may include identifying, via the hardware processor, one or more graphical user interface elements included in the one or more graphical user interfaces, using one or more computerized image processing techniques.

Also, the method may include generating, via the hardware processor: metadata on presence of one or more confirmatory predictors for the one or more graphical user interface elements, and one or more confirmatory predictor vectors for the one or more graphical user interfaces based on the one or more confirmatory predictors. The method may include calculating, via the hardware processor: one or more confusion indices for the one or more confirmatory predictors, one or more confusion indices for the one or more confirmatory predictor vectors, and one or more threshold values based on the calculated confusion indices. The method may further include generating, via the hardware processor, a decision table storing one or more sequences of user interactions with the one or more graphical user interface elements. The method may also include identifying, via the hardware processor, a subset of the stored one or more sequences of user interactions as yielding a successful outcome. Also, the method may include generating and validating, via the hardware processor, a process automation model based on the identified subset of the stored one or more sequences of user interactions, using the generated one or more threshold values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems, wherein an icon is presented on a user's environment (e.g., desktop). Once the icon is activated, the self-learning bot may execute and develop the capability to accomplish the user's goal. Based on understanding of the goals, it may continuously learn the rules about actions, sequence of steps etc. and quickly accomplish the task. Further, the system may learn from observing what the user is trying to accomplish. It may identify goals, optimal paths to accomplish the goals, error scenarios etc. The system may capture and subsequently perform a task in an optimal correct path based on training, and then it may also guide the user, monitor the user's actions, and suggest to the user optimal paths or processes.

In this process, several technological challenges present themselves, which embodiments of the present disclosure may overcome. First, a system may have to understand various screens that a process flow goes through, and understand the nature of the activities performed and an order for those activities. For this, in various embodiments, a system may utilize image processing techniques to get contours, edges and deduce various information from the user interface screens. The system may create databases of screen elements, user activity, action ordering, and generate a self-organizing map with decision points. Second, a system may have to automatically generate rules governing process automation. In various embodiments, system may utilize a decision trees as explained further below. Third, a system may have to validate its learned models. For this, various embodiments may utilize confusion vectors with adaptive threshold, as explained below.

Figure 1:
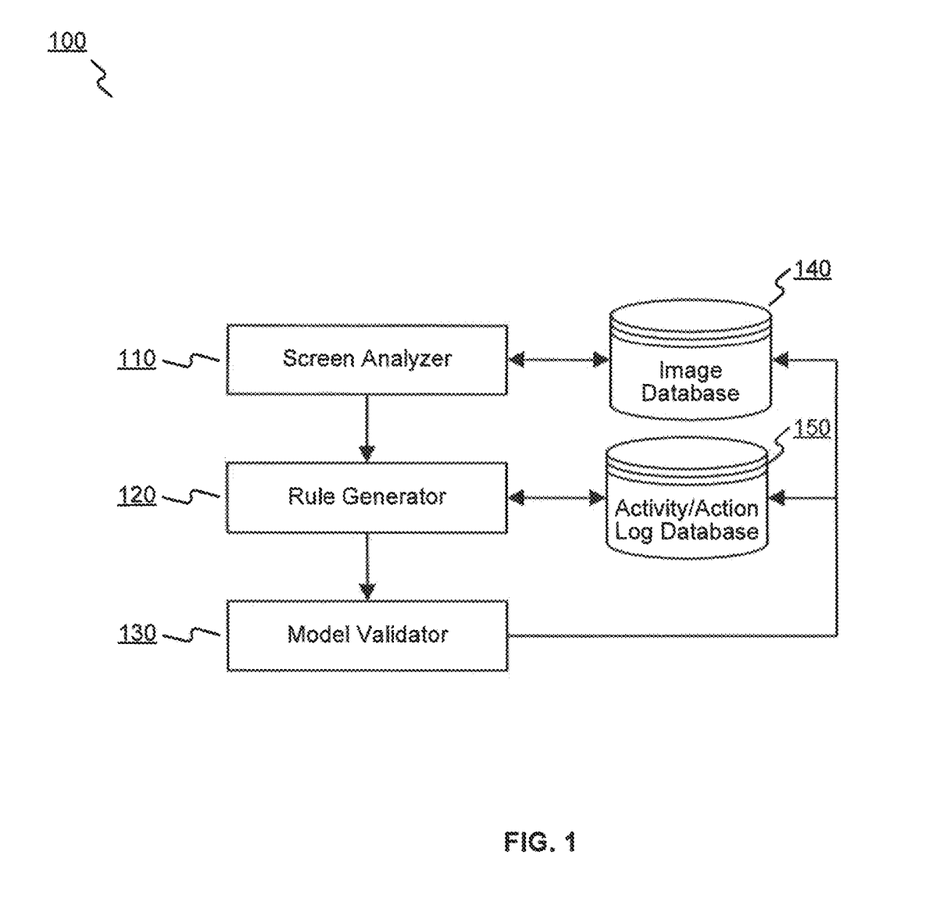
FIG. 1 illustrates an exemplary system for on-demand robotic process automation according to some embodiments.

FIG. 1 illustrates an exemplary system 100 for on-demand robotic process automation according to some embodiments. In some embodiments, a system 100 may include a screen analyzer 110, a rule generator 120, a model validator 130, an image database 140, and an activity/action log database 150. Image database 140 may store images of all screens, screen components, popup screens, information messages or error messages. Further, an activity/action log database 150 may store the parameters, actions, activities and flow order associated with each image.

Figure 2:
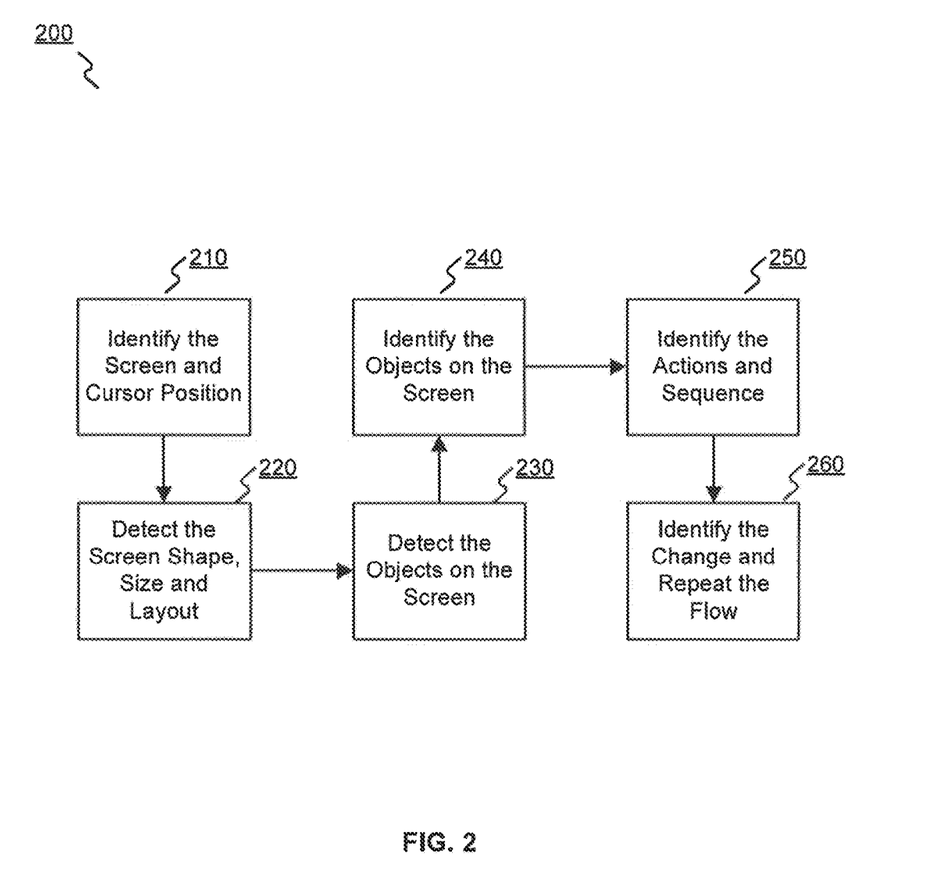
FIG. 2 is a flow diagram illustrating an example screen analysis procedure according to some embodiments.

In some embodiments, a screen analyzer 110 may understand various screen that a process flows through. It may understand actions and activities performed, and their ordering. FIG. 2 is a flow diagram illustrating an example screen analysis procedure 200 according to some embodiments. In some embodiments, screen analyzer 110 may use image processing techniques (e.g., edge detection, Optical Character Recognition (OCR)) to get contours and edges, and deducing various elements from the screen and labeling them. In some embodiments, screen analyzer may create database tables of screen elements, user activity, and action order. Based on this, screen analyzer 110 may generate a self-organizing map with decision points reflecting the process flow. For example, at step 210, screen analyzer 110 may identify the graphical user interface screen, and identify the cursor position (e.g., of a mouse connected to the user device). At step 220, screen analyzer 110 may detect the screen shape, size, and layout. At step 230, screen analyzer 110 may detect the objects (e.g., text boxes, labels, button, drop-down lists, sliders, etc.) present in the screen of the graphical user interface. At step 240, screen analyzer 110 may identify the objects on the screen (e.g., by determining the function(s) associated with the objects). At step 250, screen analyzer 110 may monitor the user's actions, and identify the user actions (text input, button click, etc.) and sequence of actions. And at step 260, screen analyzer 110 may identify any change in the user actions and sequence for a given screen compared to previous monitoring trials where the user utilized the same screen. In some embodiments, screen analyzer 110 may repeat the process flow performed by the user.

For example, screen analyzer 110 may use a getscreen( ) method which can provide the screen details using the screen title and mouse pointer position on the screen. The screen details may include the objects on the screens, actions performed by the user on the screen, and action order on the screen. The screen details may include objects on the screen such as Images, Buttons, Icons, Shortcut Keys, Controls such as Textboxes, Labels, Dropdowns, Hyperlinks, etc. The screen details may be stored in a Screen state table which may have a structured system for storing such information, and may store the details of all the screens as navigation takes place.

Figure 3:
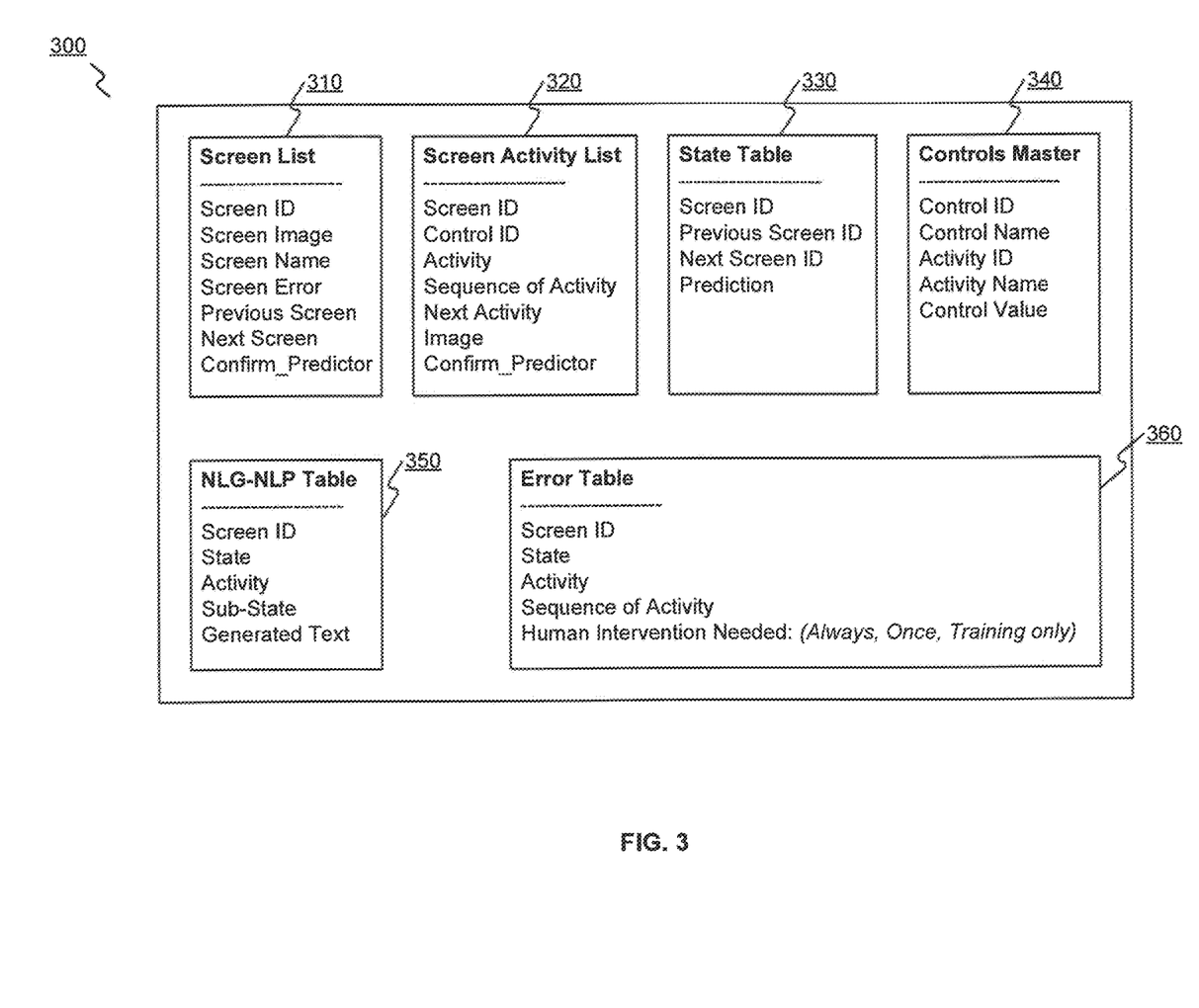
FIG. 3 is a functional block diagram of an organizing map table according to some embodiments.

FIG. 3 is a functional block diagram of an organizing map table 300 according to some embodiments. In some embodiments, an organizing map table may organize the screens/objects of the any enterprise process, by capturing the user activities performed and the sequences of action. For example, the organizing map table 300 may include a screen list 310, listing all screens (or all screens accessed during the course of the process flow) in an application with a graphical user interface. Further, the organizing map table 300 may include a screen activity list 320, which may log all user interaction with the screens. For example, the screen activity list 320 may list a screen ID, a control ID (e.g., representing a textbox, label, button, etc.), an activity (e.g., right-click, click, text input, radio button selection, etc.), a sequence of activity (e.g., in order of time or in order of logical sequence), a next activity (e.g., in the form of a linked list), an image (e.g., corresponding to the particular control being activated), and a confirmatory predictor (explained further in this disclosure). Also, the organizing map table 300 may include a state table 330, which may store a list of states. For example, state table 330 may store a screen ID, a previous screen ID, a next screen ID, and/or a prediction for any of the above parameters. Further, the organizing map table 300 may include a controls master 340, which may store including a control ID, a control name, an activity ID, an activity name (e.g., click, right-click, mouseover, textbox input, etc.), and a control value. The organizing map table 300 may include a natural language generation-natural language processing ("NLG-NLP") table 350, which may store parameters such as screen ID, state, activity, sub-state, and generated text, etc. Finally, the organizing map table 300 may include an error table 360, which may log parameters such as screen ID, state (e.g., when error occurred), activity (e.g., when error occurred), sequence of activity (e.g., that led to the error), and any human intervention needed to exit from error condition.

Figure 4:
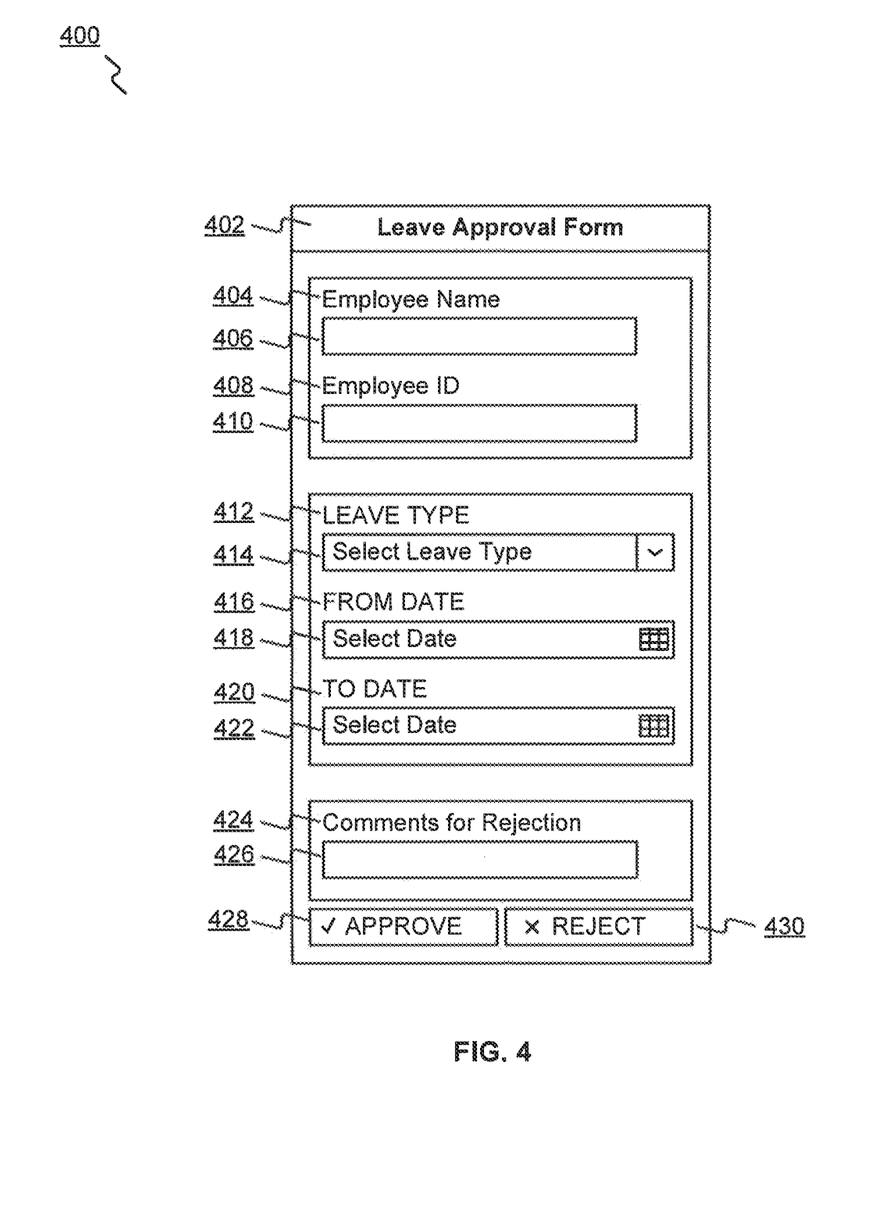
FIG. 4 illustrates an example graphical user interface analyzed according to some embodiments.

FIG. 4 illustrates an example graphical user interface 400 analyzed according to some embodiments. In some embodiments, an application may provide a graphical user interface screen that represents a leave application form 402. The form may include various screen elements, such as labels 404, 408, 412, 416, 420, and 424. In addition, the form may include elements that perform functions upon user activation, such as drop-down boxes (e.g., 414), date selectors (e.g., 418, 422), buttons (428, 430), radio buttons, and text boxes (e.g., 406, 410, 426), etc.

Figure 5:
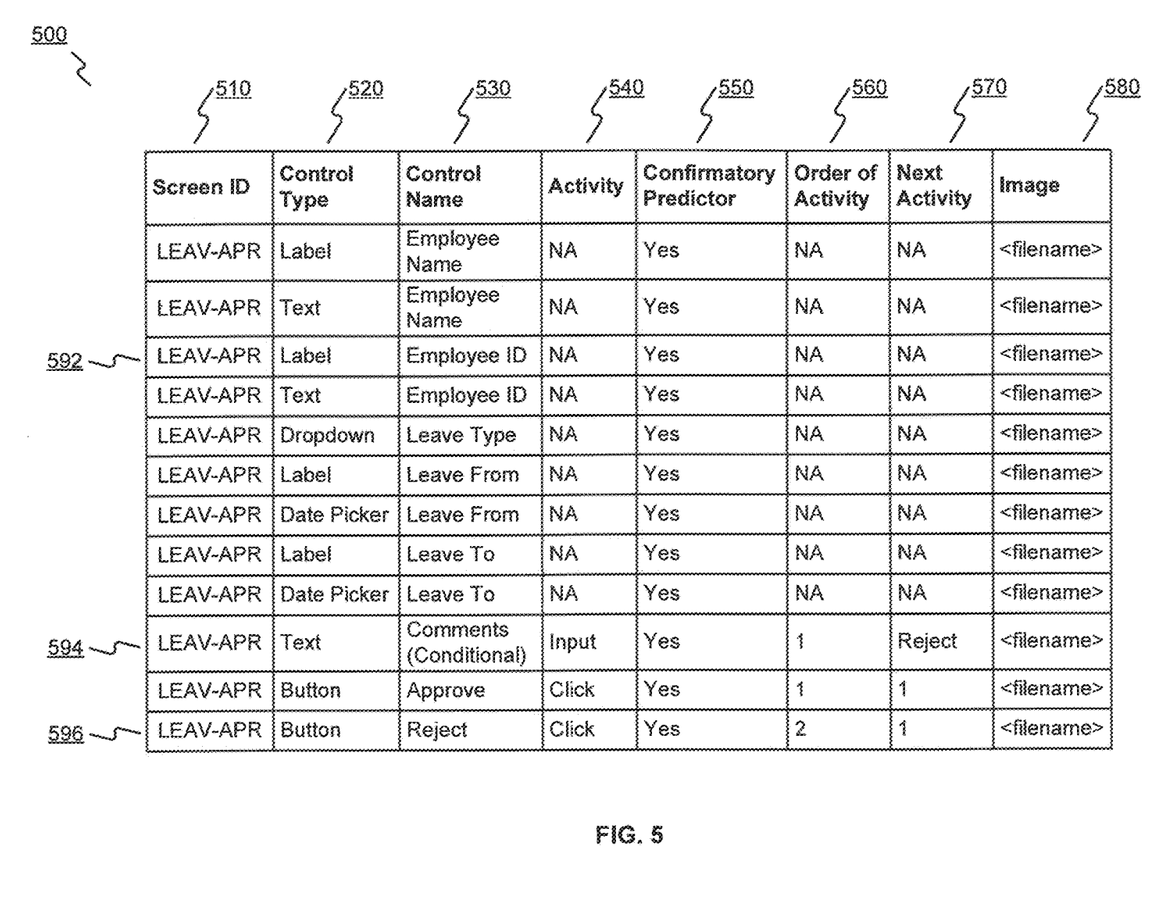
FIG. 5 is a functional block diagram illustrating aspects of an organizing map table according to some embodiments.

For such a screen, FIG. 5 is a functional block diagram illustrating aspects of an organizing map table according to some embodiments. In some embodiments, organizing map table 500 may store the screen's details in a table form. Such a table may include columns such as, without limitation, screen ID, control ID, control name, activity, confirmation predictor (yes/no) flag, order of activity, next activity, and image. By including values for such parameters, the organizing table may identify which screen elements may be activated by users. An order of activity may be provided for such screen elements. For example, in row 592, since the screen element is a label that cannot be activated by a user, it lacks activity-related information. By contrast, rows 594 and 596 both provide activity-related information of different types (e.g., 594 for a textbox and 596 for a button).

Figure 6:
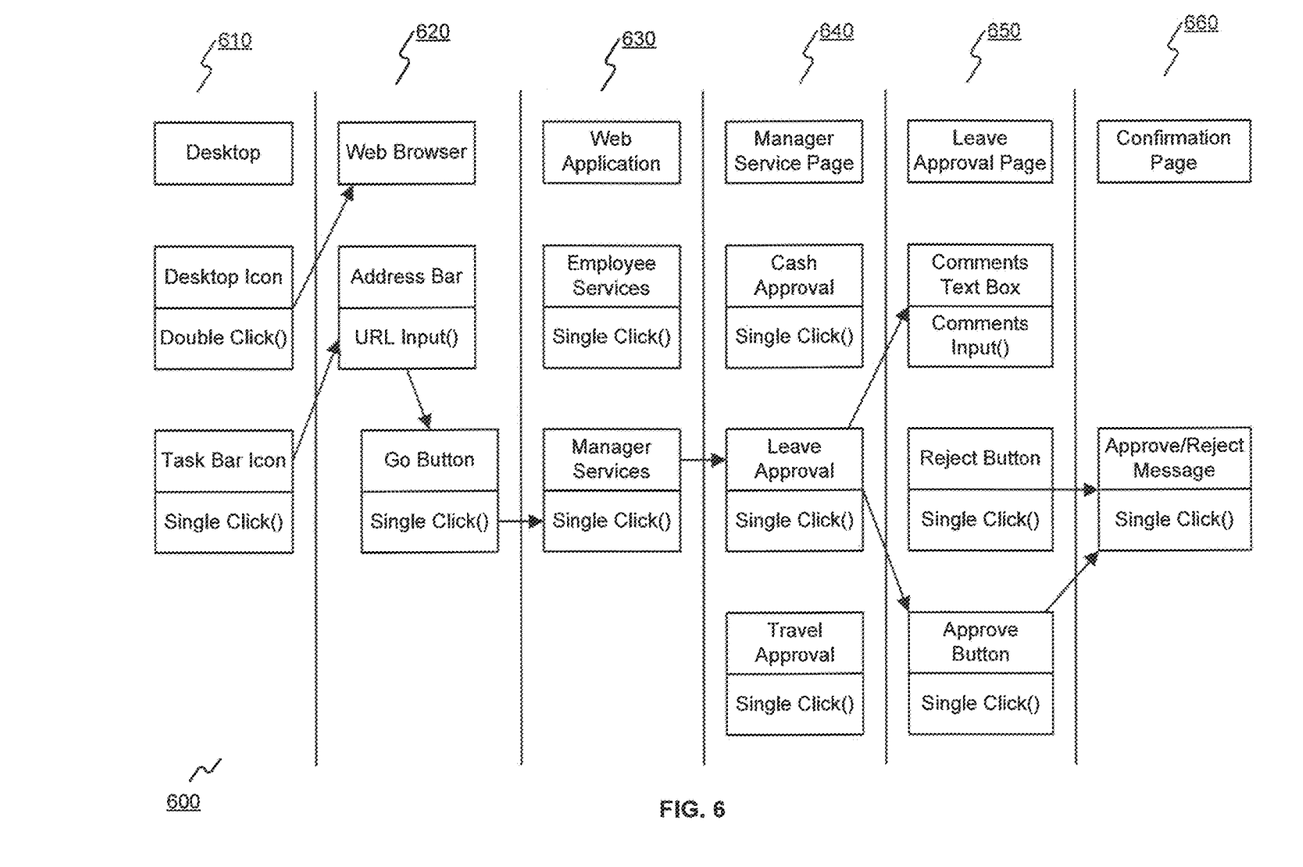
FIG. 6 is a flow diagram illustrating an example process for automation according to some embodiments.

In a related discussion, FIG. 6 is a flow diagram 600 illustrating an example process for automation according to some embodiments. In some embodiments, an organizing map table 500 may be related to a decision flow of leave approval through a number of applications and screens. For example, at column 610, on a desktop, a desktop icon may be double-clicked, or a task bar icon may be single-clicked. In response, at column 620, a web browser may be opened, wherein a URL may be input into an address bar, and a "GO" button single-clicked. At column 630, a web application may be launched, wherein a manager services button may be single-clicked. At column 640, a manager service page within the web application may be opened. In the manager service page, a leave approval button may be single-clicked, which may lead to a leave approval screen form at column 650. In the leave approval screen form, a "comments" textbox may be filled with comments input, and an approve button may be single-clicked. In response, at column 660, a confirmation page may be provided, wherein an approval/reject message may be displayed with an associated button to acknowledge receipt of the message.

Again with reference to FIG. 1, in some embodiments, a rule generator 120 may build a decision tree (rules) with valid values and extremas, and optimize the rules using confirmatory predictors. In some embodiments, rule and log information can be associated with a set of actions whose variables and their associated values define rules. Rules may be derived from success and failure logs. A wide range of factors may contribute in defining this relationship: the action recently occurred, the values of variables associated with the actions, and the specific order of actions. Each action and its value may define the number, order, names, and types of the variables that build the rule. Each value of an action may include a timestamp, which represents the time of occurrence. The system may then:

1. Determine the relevant screen and timeframe to consider, e.g., the window size
    2. Identify the relevant action types and their values;
    3. Find factors affecting value of the variables;
    4. Find an order with time frame and start and end actions with associated variables and values;
    5. Apply relation rules to related the actions to each other; and
    6. Identify any failure/non-relevant constraints.

Figure 7:
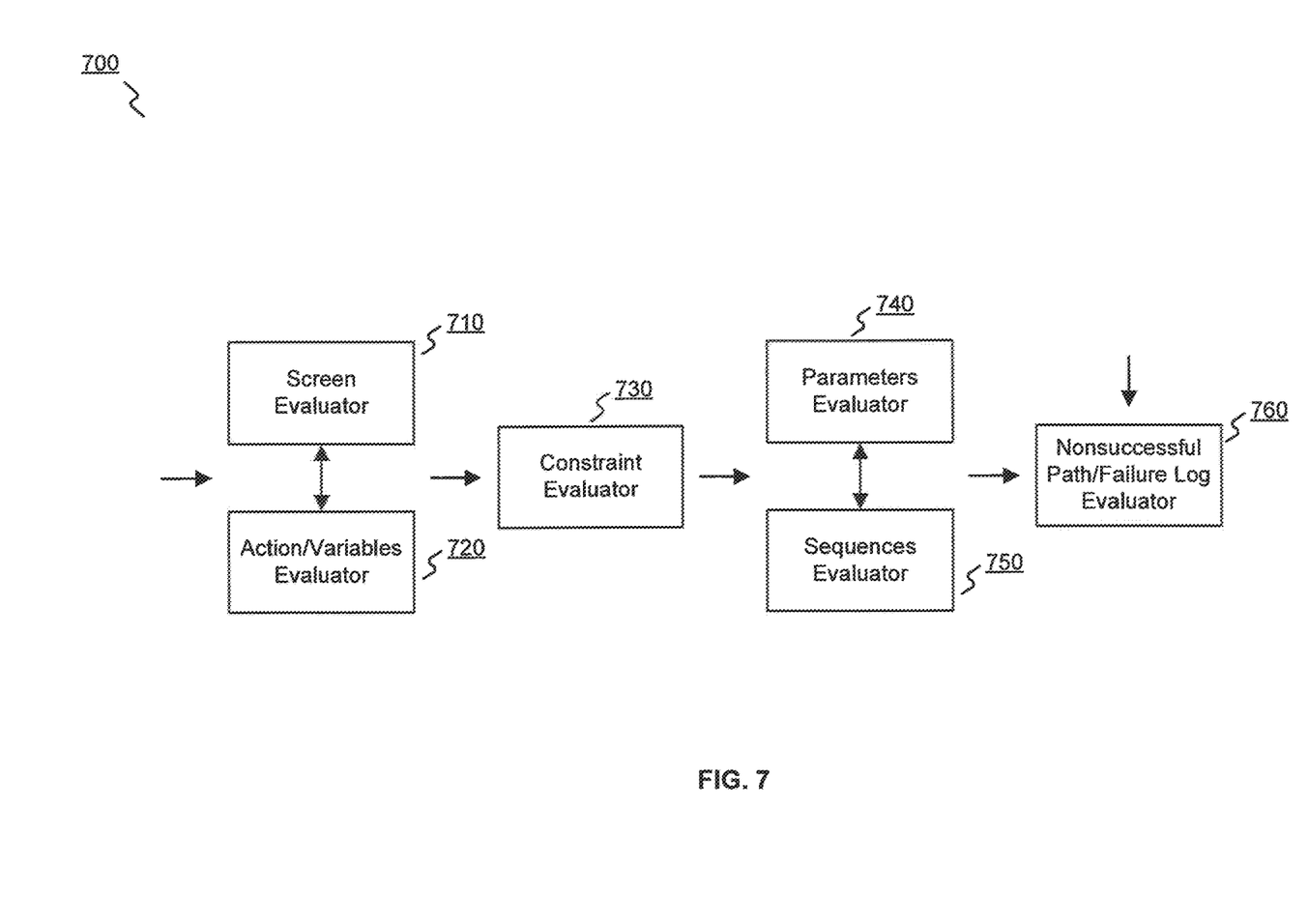
FIG. 7 is a flow diagram illustrating an example process automation rules generation procedure according to some embodiments.

FIG. 7 is a flow diagram illustrating an example process automation rules generation procedure according to some embodiments. At block 720, an Action Evaluator may find out which action types and variables are relevant for the rule to be generated. The Action Evaluator may determine which action types are required for the action to occur. It may consider the time window for action to occur as an optional input parameter taken from configuration file. The Action Evaluator may discard actions that occurred outside the scope of the time duration. The Action evaluator may check each of the successful logs so that it finds occurrences where starts and end-of-time stamps were detected. In case the time window is unknown, the algorithm may progressively increase the time duration window and, for each considered size, run the Action evaluator assuming that time as valid. As more actions enter the time window, more action types may be detected as relevant. At a certain point this growth stops, and the number of actions stabilizes in a plateau. This may be considered as the right time window; then actions, variables, the time duration, and screen(s)/state(s) may be considered as valid.

At block 710, a Screen Evaluator may find the minimal variables related to screen, to confirm which screen the user is currently in. It may also store additional information about objects, such as whether the object is mandatory/optional, and variables like shape, color, size, position etc. Also, the screen evaluator may capture all relevant actions and variables occurring in the screen, and timeline, i.e., the order as well as the time window.

At block 730, a Constraint Evaluator may find constraints for actions based on the values of their variables. The Constraint Evaluator may receive as input the successful scenario logs after they have been filtered by the Screen evaluator and Actions Evaluator. The former may resize logs based on the screen and time window limit, while the latter may remove non-relevant action types. The Constraint Evaluator may learn the set of constraints that select the required basic actions based on the value of their variables.

At block 740, a Parameter Evaluator may find the parameters that associate the value of variables in different actions. The Parameter Evaluator may receive as input the successful scenario logs after all actions that do not match the constraints identified by the Constraint Evaluator have been removed. It may perform its function based on the relations between the values of variables belonging to different actions. The automatic rule generators can support arithmetic operators including basic logical operators (less than, equal, greater than, etc.).

At block 750, a Sequences Evaluator may determine an ordering of relations that hold among basic actions. It may produce a set of ordering constraints that has to be satisfied to produce a composite action. This module may extract all the ordering constraints in isolation among the actions appearing in it and then intersect all the order constraints extracted from individual log info, keeping only those that appear in all logs.

At block 760, a Failure Log Evaluator may find failure constraints, and also any trials not included in the success scenario log will be added here. The Failure Log Evaluator also may consider non-relevant/unsuccessful scenario logs. It may look for finding primitive actions that do not appear in a successful log. To do so, the Failure Log Evaluator may take as input the successful scenario log set of all the constraints generated by the other modules in previous steps. Then, it may select the failure logs information that is not part of success log scenario.

Figure 8:
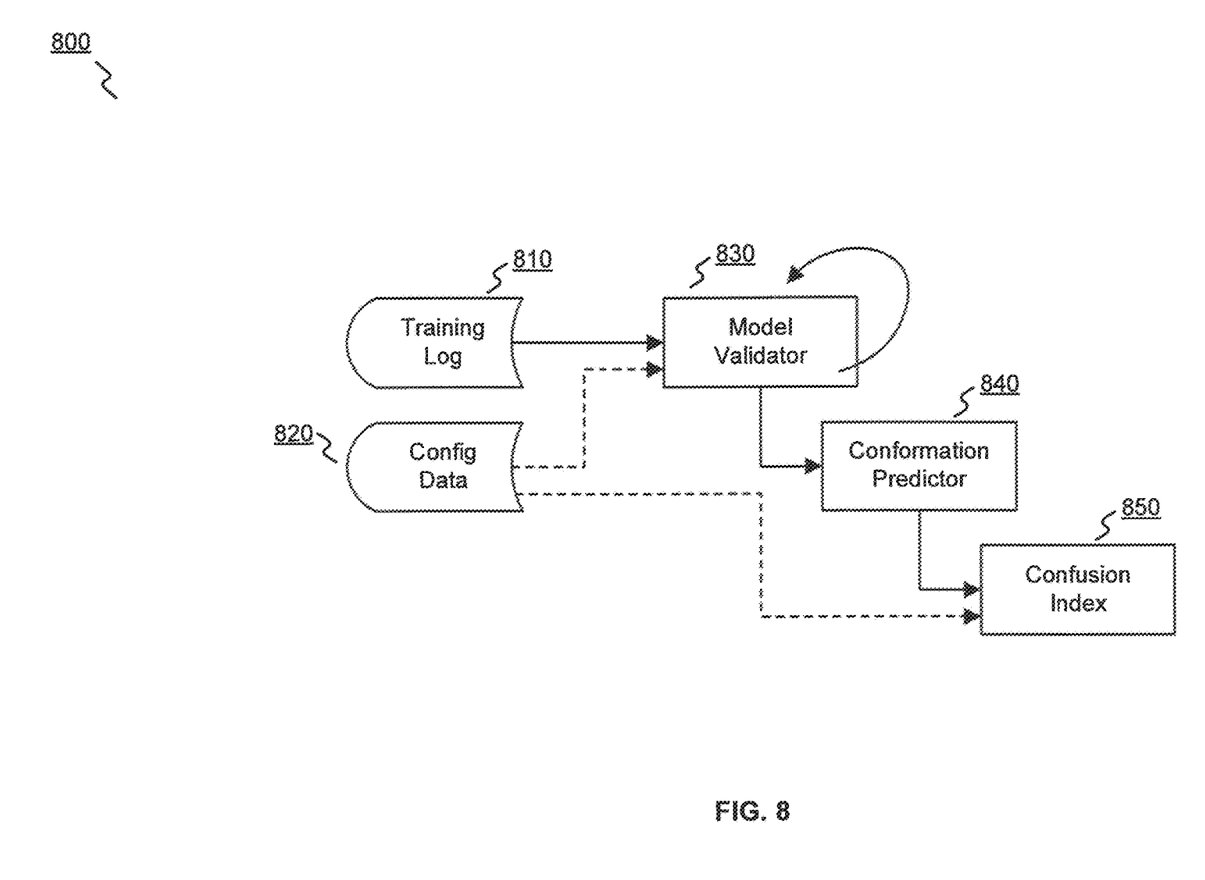
FIG. 8 is a flow diagram illustrating an example automation model validation procedure according to some embodiments.

Again with reference to FIG. 1, in some embodiments, a model validator 130 may validate learned models and analyze the goal achieved using confusion vectors with adaptive thresh-holding, thereby continuously updating the models for optimized results. FIG. 8 is a flow diagram illustrating an example automation model validation procedure according to some embodiments. In some embodiments, an automation model validation procedure may be trained multiple times for end-to-end process. In each process, multiple screens may be involved, and each screen's details may be captured in training logs 810. Using these training logs, a model validator 830 may validate the models built.

Specifically, confirmatory predictors 840 may be a combination of objects, events, positions, or combinations of specific states (or screens). Confirmatory predictors may be determined dynamically for each screen in each training set. In some embodiments, the number of confirmatory predictors may be picked based on configuration data 820 of the system. A confusion index 850, analogous to a confusion matrix in the machine learning art, may be calculated per object/event/positon or similar combination for a specific state (screen). Based on training data and occurrence of confirmatory predictors and their values, a confusion index may be calculated. A confusion index may be a weighted average of confirmatory predictors calculated for a combination of objects, events, positions, or similar combinations. For each confirmatory predictor, a confusion index may be calculated. Further, an adaptable threshold may be calculated and fixed for every given training data set at the time of model building. In some embodiments, the lesser the threshold value, the higher the success rate.

For example, with reference to FIG. 6, initially, for each screen, the system may select/define confirmatory predictors resulting in a confirmatory predictor vector. Module validator 830 may use training logs to build the confirmatory predictor vector. Confirmatory predictors may be a combination of objects, events, positions, orders, timelines, or similar combinations in specific states (or screens). This information may be found for the minimum required objects (e.g., mandatory objects) in each screen in multiple training sets.

For each screen, there can be many confirmatory predictors. For each confirmatory predictor vector, a confusion index may be defined. In some embodiments, a confusion index may be calculated as a weighted average of confirmatory predictor vectors. Since there can be many confirmatory predictors in a screen, and each predictor may have a confusion index, for each screen a confusion index hierarchy may be built.

For each screen, outliers may be identified and a set of thresholds created in a dynamic manner, based on parameters such as number, distance, closeness, and computing arithmetic/geometric/harmonic means, based on multiple runs of the process that is being given to the robot for learning and automation.

After learning based on training of the bot through multiple runs of the same process, the bot may be tested using a new set of process runs. During testing, comparison of values of confirmatory predictors within the thresholds set during training may be used to validate the bot's learning.

Accordingly, in various embodiments, based on understanding of the goals, the system may continuously learn the rules about actions, sequence of steps etc. and quickly accomplish tasks in automated fashion spanning across multiple applications and even devices. These solutions may learn from observing what the user is trying to accomplish. It may identify goals, optimal paths to accomplish the goals, error scenarios etc. The solution may capture a user's performance of the task, then perform the task in an optimal correct path based on training, by which it may guide the user, monitor the user, and suggest to the user alternate optimal paths or processes to accomplish the task.

Further, various embodiments may provide reliable solution by internally calculating a score about the confidence level to accomplish a particular task (e.g., a confusion index). Based on the confidence score, it may assist the user in accomplishing the task.

Computer System

Figure 9:
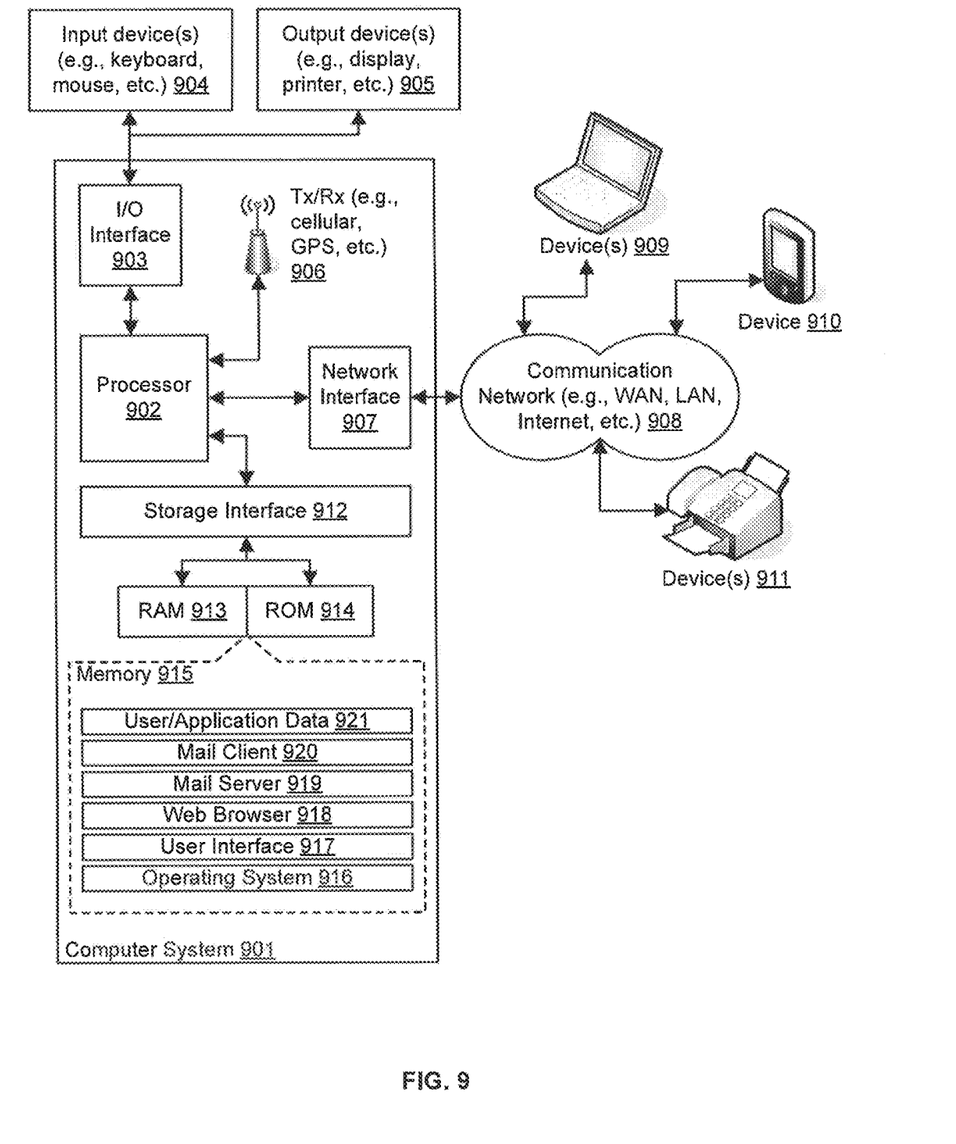
FIG. 9 is a block diagram of an exemplary computer system for implementing embodiments consistent with the present disclosure.

FIG. 9 is a block diagram of an exemplary computer system for implementing embodiments consistent with the present disclosure. Variations of computer system 901 may be used for implementing the devices and systems disclosed herein. Computer system 901 may comprise a central processing unit ("CPU" or "processor") 902. Processor 902 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 910, 911, and 912. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and methods for creating on-demand robotic process automation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for adaptive process automation, comprising:
a hardware processor; and
a memory storing instructions executable by the hardware processor for:
executing, via the hardware processor, one or more applications providing one or more graphical user interfaces;
obtaining, via the hardware processor using a monitoring program, a screen capture image of the one or more graphical user interfaces;
identifying, via the hardware processor, one or more graphical user interface elements included in the screen capture image of the one or more graphical user interfaces, using one or more computerized image processing techniques;
generating, via the hardware processor:
metadata on presence of one or more confirmatory predictors for the one or more graphical user interface elements, and
one or more confirmatory predictor vectors for the one or more graphical user interfaces based on the one or more confirmatory predictors,
calculating, via the hardware processor:
one or more confusion indices for the one or more confirmatory predictors and the one or more confirmatory predictor vectors, and
one or more threshold values based on the calculated one or more confusion indices;
generating, via the hardware processor, a decision table storing one or more sequences of user interactions with the one or more graphical user interface elements;
identifying, via the hardware processor, a subset of the stored one or more sequences of user interactions as yielding a successful outcome, wherein the identification of the subset of the stored one or more sequences of user interactions is based on a time window for an interaction to occur,
and wherein the identification comprises discarding the user interactions that are made outside of the time window,
and wherein the time window is based on a parameter defined in a configuration file of the one or more graphical user interfaces,
and wherein the time window of considering a user interaction as a part of the subset of the stored one or more sequences of user interactions is gradually increased to a pre-defined plateau point, when the time window is not specifically defined in the configuration file; and
generating and validating, via the hardware processor, a process automation model based on the identified subset of the stored one or more sequences of user interactions, using the generated one or more threshold values; and suggesting a process to a user based on the validated process automation model.

2. The system of claim 1, wherein the metadata further includes data related to an order of user interaction with the one or more graphical user interface elements.

3. The system of claim 1, wherein the metadata further includes data on a type of user action associated with the one or more graphical user interface elements.

4. The system of claim 1, wherein at least one of the one or more applications is a web browser.

5. The system of claim 1, wherein the user interactions include at least one text input and at least one click input.

6. The system of claim 1, wherein one of the confirmatory predictors includes a combination of one or more of an object, an event, a position, an order, or a timeline in a graphical user interface screen.

7. The system of claim 1, wherein the one or more confusion indices for the one or more confirmatory predictor vectors are calculated as a weighted average of the one or more confirmatory predictors.

8. A method for adaptive process automation, comprising:
executing, via a hardware processor, one or more applications providing one or more graphical user interfaces;
obtaining, via the hardware processor using a monitoring program, a screen capture image of the one or more graphical user interfaces;
identifying, via the hardware processor, one or more graphical user interface elements included in the screen capture image of the one or more graphical user interfaces, using one or more computerized image processing techniques;
generating, via the hardware processor:
metadata on presence of one or more confirmatory predictors for the one or more graphical user interface elements, and
one or more confirmatory predictor vectors for the one or more graphical user interfaces based on the one or more confirmatory predictors,
calculating, via the hardware processor:
one or more confusion indices for the one or more confirmatory predictors and the one or more confirmatory predictor vectors, and
one or more threshold values based on the calculated one or more confusion indices;
generating, via the hardware processor, a decision table storing one or more sequences of user interactions with the one or more graphical user interface elements;
identifying, via the hardware processor, a subset of the stored one or more sequences of user interactions as yielding a successful outcome, wherein the identification of the subset of the stored one or more sequences of user interactions is based on a time window for an interaction to occur,
and wherein the identification comprises discarding the user interactions that are made outside of the time window,
and wherein the time window is based on a parameter defined in a configuration file of the one or more graphical user interfaces,
and wherein the time window of considering a user interaction as a part of the subset of the stored one or more sequences of user interactions is gradually increased to a pre-defined plateau point, when the time window is not specifically defined in the configuration file; and
generating and validating, via the hardware processor, a process automation model based on the identified subset of the stored one or more sequences of user interactions, using the generated one or more threshold values; and
suggesting a process to a user based on the validated process automation model.

9. The method of claim 8, wherein the metadata further includes data related to an order of user interaction with the one or more graphical user interface elements.

10. The method of claim 8, wherein the metadata further includes data on a type of user action associated with the one or more graphical user interface elements.

11. The method of claim 8, wherein at least one of the one or more applications is a web browser.

12. The method of claim 8, wherein the user interactions include at least one text input and at least one click input.

13. The method of claim 8, wherein one of the confirmatory predictors includes a combination of one or more of an object, an event, a position, an order, or a timeline in a graphical user interface screen.

14. The method of claim 8, wherein the one or more confusion indices for the one or more confirmatory predictor vectors are calculated as a weighted average of the one or more confirmatory predictors.

15. A non-transitory computer-readable medium storing computer-executable instructions for adaptive process automation, the instructions comprising instructions for:
executing, via a hardware processor, one or more applications providing one or more graphical user interfaces;
obtaining, via the hardware processor using a monitoring program, a screen capture image of the one or more graphical user interfaces;
identifying, via the hardware processor, one or more graphical user interface elements included in the screen capture image of the one or more graphical user interfaces, using one or more computerized image processing techniques;
generating, via the hardware processor:
metadata on presence of one or more confirmatory predictors for the one or more graphical user interface elements, and
one or more confirmatory predictor vectors for the one or more graphical user interfaces based on the one or more confirmatory predictors,
calculating, via the hardware processor:
one or more confusion indices for the one or more confirmatory predictors and the one or more confirmatory predictor vectors, and
one or more threshold values based on the calculated one or more confusion indices;
generating, via the hardware processor, a decision table storing one or more sequences of user interactions with the one or more graphical user interface elements;
identifying, via the hardware processor, a subset of the stored one or more sequences of user interactions as yielding a successful outcome, wherein the identification of the subset of the stored one or more sequences of user interactions is based on a time window for an interaction to occur,
and wherein the identification comprises discarding the user interactions that are made outside of the time window,
and wherein the time window is based on a parameter defined in a configuration file of the one or more graphical user interfaces,
and wherein the time window of considering a user interaction as a part of the subset of the stored one or more sequences of user interactions is gradually increased to a pre-defined plateau point, when the time window is not specifically defined in the configuration file; and generating and validating, via the hardware processor, a process automation model based on the identified subset of the stored one or more sequences of user interactions, using the generated one or more threshold values; and suggesting a process to a user based on the validated process automation model.

16. The medium of claim 15, wherein the metadata further includes data related to an order of user interaction with the one or more graphical user interface elements.

17. The medium of claim 15, wherein the metadata further includes data on a type of user action associated with the one or more graphical user interface elements.

18. The medium of claim 15, wherein at least one of the one or more applications is a web browser.

19. The medium of claim 15, wherein one of the confirmatory predictors includes a combination of one or more of an object, an event, a position, an order, or a timeline in a graphical user interface screen.

20. The medium of claim 15, wherein the one or more confusion indices for the one or more confirmatory predictor vectors are calculated as a weighted average of the one or more confirmatory predictors.

* * * * *